United States Patent
Gudmundsen et al.

(10) Patent No.: US 8,625,827 B2
(45) Date of Patent: *Jan. 7, 2014

(54) ONE-SIZE-FITS-MOST HEARING AID

(75) Inventors: Gail Gudmundsen, Elk Grove Village, IL (US); Viorel Drambarean, Elk Grove Village, IL (US); Mead C. Killion, Elk Grove Village, IL (US); Jonathan K. Stewart, Bloomingdale, IL (US)

(73) Assignee: Etymotic Research, Inc., Elk Grove Village, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,963

(22) Filed: Apr. 26, 2012

(65) Prior Publication Data

US 2012/0213396 A1    Aug. 23, 2012

Related U.S. Application Data

(63) Continuation of application No. 11/031,915, filed on Jan. 7, 2005, now Pat. No. 8,184,839.

(60) Provisional application No. 60/534,720, filed on Jan. 7, 2004.

(51) Int. Cl.
*H04R 25/00* (2006.01)

(52) U.S. Cl.
USPC .......................... 381/323; 381/322; 381/328

(58) Field of Classification Search
USPC ......... 381/312, 314, 322, 323, 324, 328, 330, 381/380; 429/96–100; 181/129, 130, 135; 455/351; 29/825

See application file for complete search history.

(56) References Cited

U.S. PATENT DOCUMENTS

| 5,369,802 | A  | * | 11/1994 | Murray ........................ 455/351 |
| 5,623,550 | A  | * | 4/1997  | Killion ........................ 381/322 |
| 6,382,346 | B2 | * | 5/2002  | Brimhall et al. ............. 181/135 |
| 6,516,074 | B1 | * | 2/2003  | Brimhall et al. ............. 381/322 |
| 6,532,295 | B1 | * | 3/2003  | Brimhall et al. ............. 381/328 |
| 6,722,024 | B2 | * | 4/2004  | Chow ............................. 29/825 |
| 8,184,839 | B2 | * | 5/2012  | Gudmundsen et al. ....... 381/323 |

* cited by examiner

*Primary Examiner* — Huyen D Le
(74) *Attorney, Agent, or Firm* — McAndrews, Held & Malloy, Ltd.

(57) ABSTRACT

A hearing-aid device comprising a housing and circuitry module, wherein the circuitry module comprises a battery, a microphone, and a receiver, and the circuit module is inserted in the hearing aid housing. The hearing aid device further comprises a retractable battery sleeve, wherein a battery slot is exposed when the battery sleeve is retracted, and a battery can be inserted into the battery slot from either side of the battery slot with either polarity. The hearing aid housing may comprise an ear-tip, wherein a microphone is mounted in the hearing aid housing near the ear-tip and the microphone receives sounds through at least one sound inlet located on a side surface of the hearing aid housing. The ear-tip additionally comprises three flanges decreasing in size toward the flange closest to the ear canal, and the hearing aid can be inserted into the ear canal in any orientation.

15 Claims, 8 Drawing Sheets

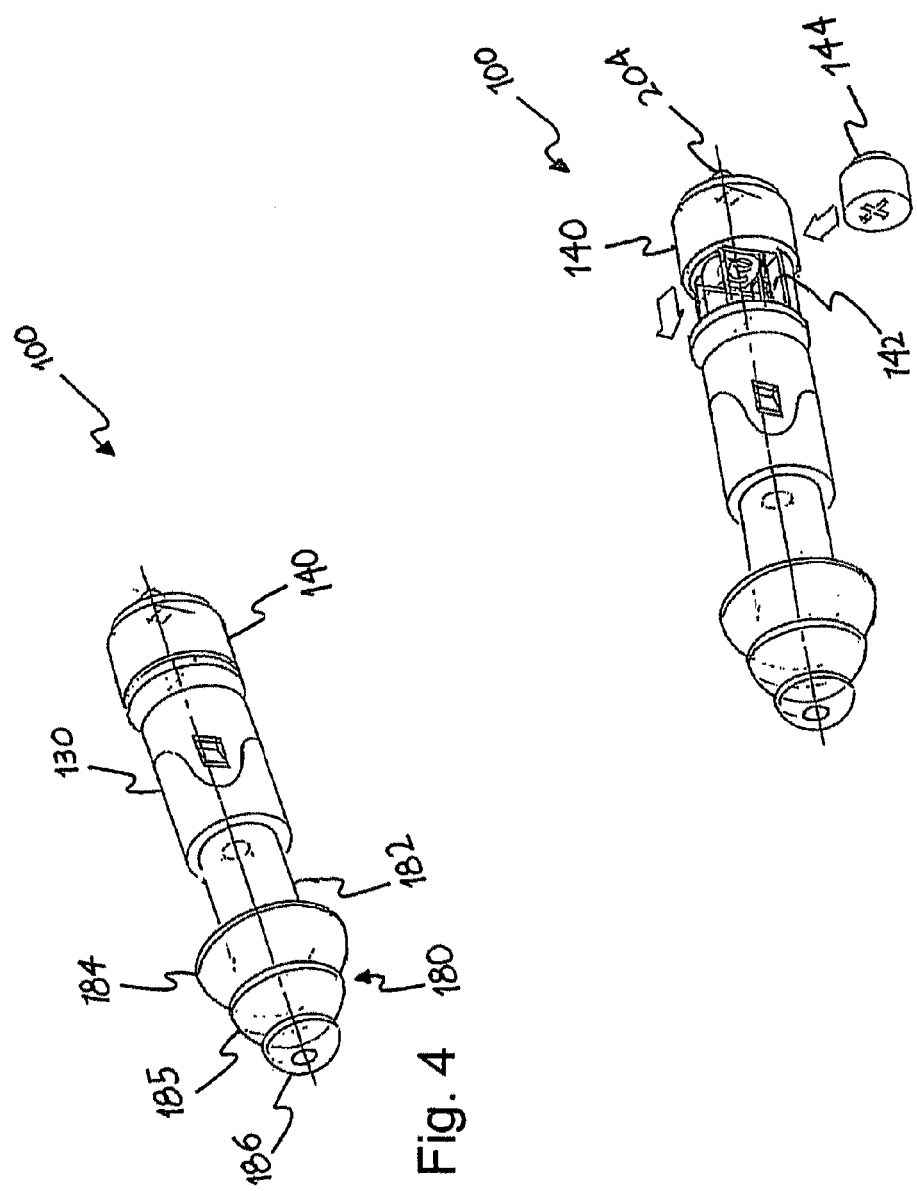

ONE-SIZE-FITS-MOST HEARING AID

RELATED APPLICATIONS

This application is a continuation of U.S. patent application Ser. No. 11/031,915, now U.S. Pat. No. 8,184,839, entitled "One-Size-Fits-Most Hearing Aid," filed on Jan. 7, 2005, which makes reference to, claims priority to and claims benefit from United States Provisional Patent Application Ser. No. 60/534,720, entitled "One-Size-Fits-Most Hearing Aid," filed on Jan. 7, 2004. The entire contents of each above-mentioned prior-filed application is hereby expressly incorporated herein by reference.

This application makes reference to:
U.S. Pat. No. 4,170,720, filed Mar. 3, 1978;
U.S. Pat. No. 4,852,683, filed Jan. 27, 1988;
U.S. Pat. No. 5,131,046, filed Nov. 3, 1989
U.S. Pat. No. 5,113,967, filed May 7, 1990;
U.S. Pat. No. 5,623,550, filed Mar. 9, 1995
U.S. Pat. No. 5,887,070, filed Dec. 19, 1996; and
U.S. Pat. No. 6,666,295, filed Jan. 23, 2001.

The above stated patents are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

While affluent consumers with mild hearing loss can readily obtain professionally fitted binaural hearing aids for a high cost, that high cost is out of the question for the 20-40% of those who may need hearing aids but cannot afford them. FIG. 1 illustrates an exemplary high-cost custom-made hearing aid 10 that provides good performance during constant use. The conventional in-the-ear hearing aid 10 may comprise a battery drawer 14, which swings out to accept a battery (not shown). The battery must be oriented properly before insertion to prevent wedging the battery in backwards or causing damage to the hearing aid. Microphone inlet 12 and volume control 16 are standard features on such hearing aids. Ear-tip 18 is custom molded to fit an individual's ear, so that the hearing aid must be oriented properly for insertion in the ear in order to avoid discomfort and obtain a good seal to the ear. When properly oriented and inserted, the snug fit of the ear-tip in the ear canal provides a good seal and prevents uncomfortable feedback of sounds.

Low-cost mail-ordered or over-the-counter hearing aids (such as "Hunter's aids" at sporting-goods stores) are available for a low cost compared to the professionally fitted binaural hearing aids. However, these lower cost hearing aids have certain disadvantages. For example, some of the low-cost hearing aids utilize ear-tips that fit only a fraction of the population, causing feedback whistling or discomfort for many of those who try them. Other low-cost hearing aids utilize ear-tips that may seal well if the correct one of multiple sizes is chosen, but are not cleanable and thus must be replaced regularly. Most of these low-cost hearing aids have high distortion and generally poor sound quality. Additionally, most low-cost hearing aids lack automatic wide-dynamic-range-compression amplification such as that found in the high-quality hearing aids designed for constant use, automatically adjusting the gain and frequency response so that quiet sounds are made audible while loud sounds are not uncomfortably amplified.

FIG. 2A illustrates an exemplary low-cost hearing aid 20 available on the market. This hearing aid 20 has an advanced volume control. However, an uncomfortable feedback noise typically sets in before adequate gain is obtained, rendering this type of hearing aid of marginal or no benefit to the user. In this hearing aid 20, the battery may be replaced by unscrewing battery cap 24 and inserting a new battery. For the hearing aid 20 to function, proper battery orientation must be maintained. Hearing aid 20 must be properly oriented to fit in the ear. Single-flange ear-tip 28 provides a seal to some ears, but internal feedback on many of these hearing aids results in a whistling noise at low volume control settings, which makes the seal to the ear irrelevant. The hearing aid 20 also comprises microphone inlet 22 and volume control 26. This hearing aid is not designed to an individual's ear, but is instead intended to fit most users.

FIG. 2B illustrates another exemplary low-cost hearing aid 25 for people with mild to moderate hearing loss, available for purchase in non-medical environments. Hearing aid 25 may be worn as required, and not necessarily all the time. This hearing aid can be fitted at the time of purchase using a system such as, for example, Microsound's Eartuner interactive fitting system. This hearing aid is also not designed to an individual's ear, but is instead intended to fit most users. Hearing aid 20 must be properly oriented to fit in the ear.

FIG. 3 illustrates another exemplary low-cost hearing aid 30, intended to fit most users. The hearing aid 30 is a sophisticated one-size-fits most hearing aid. This hearing aid may contain high-quality amplification. Hearing aid 30 may comprise a microphone inlet 32, a battery drawer 34, and volume control 36. Ear-tip 38 has been statistically chosen to provide comfortable fit to a large number of persons when properly oriented in the ear. In this design, only low-gain amplification is usually possible because of a lack of custom fit of the ear-tip to the ear, which results in a lack of complete seal. As with the custom hearing aid 10 of FIG. 1, the battery in hearing aid 30 must be properly oriented before insertion to prevent wedging the battery in backwards, which may result in damaging the hearing aid. Hearing aid 30 must also be properly oriented to fit properly in the ear canal. Variations on hearing aid 30 are now available in which a choice of several foam ear-tips may be snapped onto a molded tip of ear-tip 38. When the proper size is chosen, hearing aid 30 can provide a good seal and good comfort for the user. Such foam ear-tips must be replaced at regular intervals, the battery must be properly oriented, and the hearing aid must still be properly oriented to fit in the ear.

Existing hearing aids are designed in irregular shapes that may approximate the shape of the ear, but are difficult for many purchasers to insert because the hearing aid must be orientated properly to be inserted comfortably and to work properly. Furthermore, existing hearing aids have battery drawers that may be difficult for certain persons to manipulate, and that require the battery to be inserted with the proper polarity, which may be a daunting task for persons whose vision and possibly sense of feel have been impaired with age or illness.

Another prior art alternative may be the Songbird disposable hearing aid, which is a low-cost hearing aid and has at least a few of the problems discussed hereinabove. The Songbird hearing aid has been compared favorably with a well-known high-performance two-channel analog hearing aid and two well-known digital hearing aids. However, the problem with the Songbird hearing aid is that because it is disposable, the annual cost of purchasing a pair of aids each month is substantially less than the cost of most professionally-dispensed hearing aids, but still out of reach of many persons in lower-income brackets.

Simplified, mass-produced, in-the-canal hearing aids currently exist (U.S. Pat. No. 4,870,688, filed May 27, 1986) and may be produced in large quantities to fit most hearing aid users, thus eliminating a need for production of hearing aids produced to fit only the one individual's ear. There are at least several disadvantages associated with this device. For example, even though the hearing aids are mass-produced, thus requiring no need for producing an individualized fit for each patient and possibly lowering the cost of production and the cost of the device, the components are selected by the patient to fit their individual hearing needs. This requires the patient to visit a specialist, which may possible increase the over-all cost of getting the hearing aid device. In addition, the design of the hearing aid shell is such that it only fits in the ear canal if oriented in a certain direction.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in an in the ear hearing aid device that does not require specific orientation of insertion in a user's ear canal to function effectively. The hearing aid device may comprise a hearing aid housing and a circuit module.

In an embodiment of the presenting invention, the circuit module may comprise a battery, a microphone, and a receiver, wherein the circuit module is inserted in the hearing aid housing. The circuit module may alone provide hearing aid functionality without additional wiring and set up with the hearing aid housing. The circuit module may further comprise an amplifier. The circuit module may also comprise a switch, wherein the switch may be an on-off switch and/or a gain-control switch.

In an embodiment of the present invention, the circuit module may further comprise a circuit board, wherein the microphone and the receiver are on opposite sides of the circuit board.

In an embodiment of the present invention, the hearing aid housing may be essentially symmetrical and may have at least a cylindrical portion. The hearing aid housing may further comprise an ear-tip, wherein the microphone may be mounted in the hearing aid housing near the ear-tip and the microphone receives sounds through at least one sound inlet located on a side surface of the hearing aid housing. The ear-tip may comprise three flanges decreasing in size toward the flange closest to the ear canal.

In an embodiment of the present invention, the hearing aid device may also comprise a retractable battery sleeve, wherein a battery slot is exposed when the battery sleeve is retracted, and a battery can be inserted into the battery slot from either side of the battery slot. In an embodiment, the battery can be inserted into the battery slot with either polarity. Additionally, the battery can be inserted in the battery slot to replace an old battery, while the old battery is still in the battery slot, and inserting a battery in the battery slot causes the old battery to be displaced without having to first separately displace the old battery.

In an embodiment of the present invention, inserting the battery in the battery slot may make the hearing aid operable, without requiring any further assembly.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 4 illustrates an exemplary one-size-fits-most hearing aid, in accordance with an embodiment of the present invention.

FIG. 5 illustrates an exemplary view of the hearing aid of FIG. 4 with the battery sleeve retracted, in accordance with an embodiment of the present invention.

DETAILED DESCRIPTION OF THE INVENTION

Figure 2A:
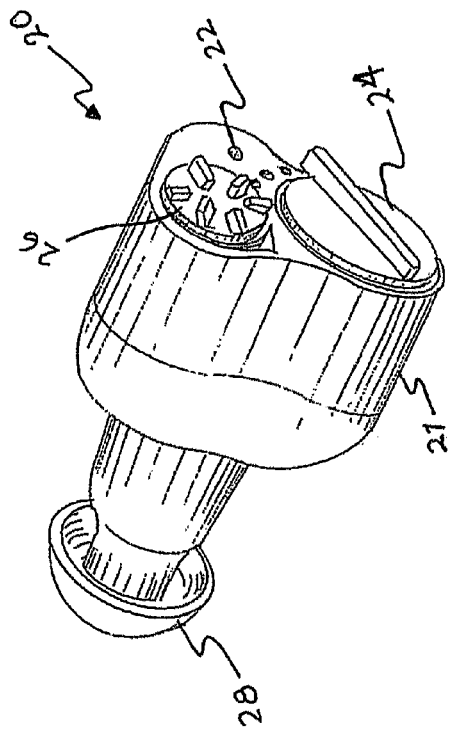
FIG. 2A illustrates an exemplary low-cost hearing aid available on the market.
Figure 2B:
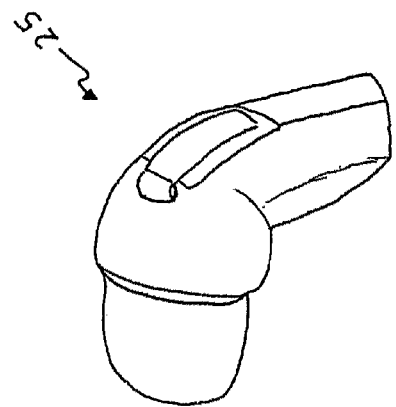
FIG. 2B illustrates another exemplary low-cost hearing aid for people with mild to moderate hearing loss, available for purchase in non-medical environments.
Figure 1:
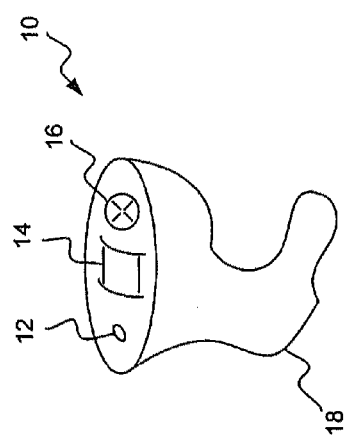
FIG. 1 illustrates an exemplary high-cost custom-made hearing aid that provides good performance during constant use.
Figure 3:
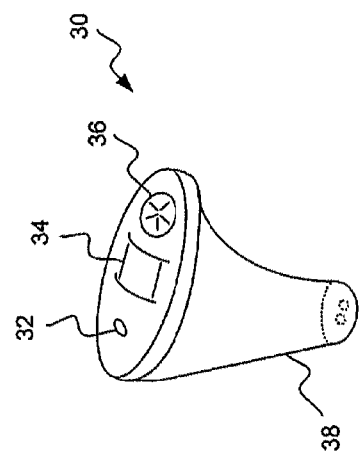
FIG. 3 illustrates another exemplary low-cost hearing aid, intended to fit most users.

This invention relates to hearing aids and especially to a lower-cost/high-quality hearing aids intended for occasional use. An embodiment of the present invention is particularly directed to hearing aids that may be purchased either from a professional or over the counter at pharmacies and retail stores.

The present invention relates generally to low-cost hearing aids, and specifically to hearing aids available for purchase over-the-counter in non-medical environments. Furthermore, the present invention relates to hearing aids designed such that they are one-size-fits-most hearing aids.

FIG. 4 illustrates an exemplary one-size-fits-most hearing aid 100, in accordance with an embodiment of the present invention. In an embodiment of the present invention, the hearing aid 100 may comprise a triple-flange ear-tip 180 attached to a cylindrical housing containing a replaceable battery, a microphone, an amplifier, a receiver to reproduce the amplified sound, and a switch.

In an embodiment of the present invention, hearing aid 100 may have a generally cylindrical shape. A battery sleeve 140 and main body or housing 130 may also be cylindrical. Ear-tip 180 may have rotational symmetry around its axis and the axis of the hearing aid 100. In particular, ear-tip flanges 184, 185, and 186 and ear-tip stem 182 may all be generally round. The use of the three ear-tip flanges 184, 185, and 186 may increase the percentage of persons who can obtain a good comfortable seal in the ear canal. The ear-tip flanges 184, 185, and 186 are in a decreasing size, whereas the smallest flange 186 is closest to the tip of the hearing aid 100, and the largest flange 184 is farthest away from the tip of the hearing aid 100. Consequentially, if the smallest flange 184 does not seal the ear canal well, the slightly larger flange 185 may do so, and if the flange 185 also does not completely seal the ear canal, the largest flange 186 may do so, thus ensuring a comfortable and good seal of the ear canal for a larger number of users than if one flange were used. In an embodiment of the present invention, the ear tip 180 may be similar to the ear tip available in high-fidelity earplugs such as, for example, the high-fidelity earplugs disclosed in U.S. Pat. No. 4,852,683, filed Jan. 27, 1988, and U.S. Pat. No. 5,113,967, filed May 7, 1990, and high-fidelity insert earphones such as, for example, the high-fidelity insert earphones disclosed in U.S. Pat. No. 5,887,070, filed Dec. 19, 1996. Accordingly, U.S. Pat. No. 4,852,683, filed Jan. 27, 1988, U.S. Pat. No. 5,113,967, filed May 7, 1990, and U.S. Pat. No. 5,887,070, filed Dec. 19, 1996, are hereby incorporated herein by reference in their entirety.

Ensuring a good seal to the ear canal for a hearing aid generally provides a good performance, because, for example, it prevents unwanted audio feedback of sounds, which may interfere with the sounds coming into the hearing aid.

FIG. 5 illustrates an exemplary view of the hearing aid 100 of FIG. 4 with the battery sleeve 140 retracted, in accordance with an embodiment of the present invention. In an embodiment of the present invention, when the battery sleeve 140 is retracted and the battery slot 142 is exposed, a battery 144 may be inserted from either side of the battery slot 142 and the battery may be inserted with either polarity. In an embodiment of the present invention, once the battery is inserted, the hearing aid 100 may become functional regardless of whether the battery sleeve 140 is in a closed or open position. Using a retractable battery sleeve 140 that accepts a battery 144 from either side with either polarity at insertion may require less dexterity from a user, which may provide an easier operation of the hearing aid 100. The design of the retractable sleeve 140 may allow any user to be able to retract the sleeve for battery replacement regardless of, for example, motor ability, vision, etc. Additionally, the design of the retractable battery sleeve 140, which may ensure that the hearing aid 100 operates upon insertion of a battery 144, even if the retractable battery sleeve 140 remains retracted, ensures that a user may be capable of enjoying the functionality of the hearing aid 100 even if the user forgets to reposition the battery sleeve 140 to a closed position.

In an embodiment of the present invention, hearing aid 100 may also comprise a switch 204, which may be a multi-position switch that functions as an on-off switch. In an embodiment of the present invention, the switch 204 may function as a volume control. In an embodiment of the present invention, the switch 204 may function as both an on-off switch and a volume control.

Figure 6:
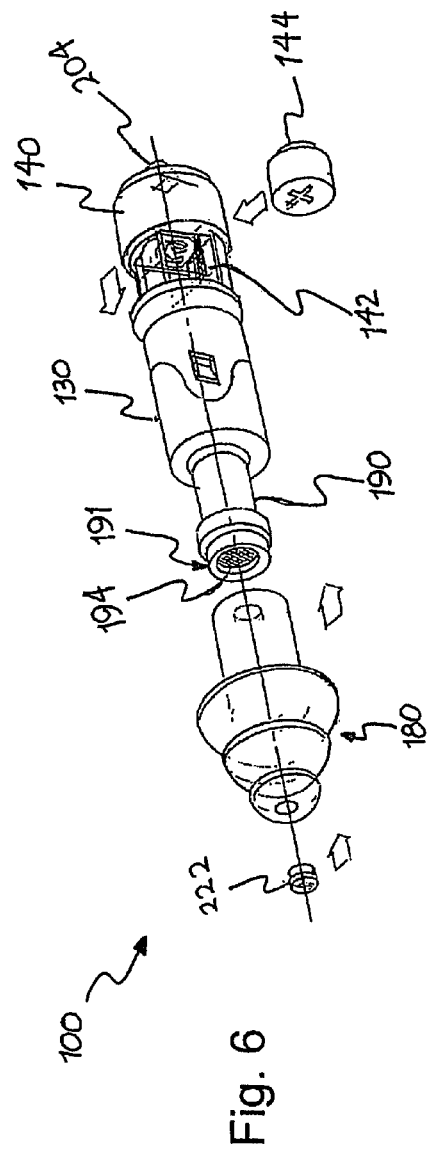
FIG. 6 illustrates an exemplary view of the hearing aid of FIG. 4 with the ear-tip removed, in accordance with an embodiment of the present invention.

FIG. 6 illustrates an exemplary view of the hearing aid 100 of FIG. 4 with the ear-tip 180 removed, in accordance with an embodiment of the present invention. In an embodiment of the present invention, the hearing aid 100 may comprise a stem 190 containing replaceable acoustic damper assembly 191. The replaceable acoustic damper assembly 191 may comprise an acoustic damper 194 as described in U.S. Pat. No. 6,666,295, filed Jan. 23, 2001. Accordingly, U.S. Pat. No. 6,666,295, filed Jan. 23, 2001, is hereby incorporated herein by reference in its entirety. In an embodiment of the present invention, the hearing aid 100 may also comprise a wax guard 222, which may be added to the ear-tip 180.

Figure 7:
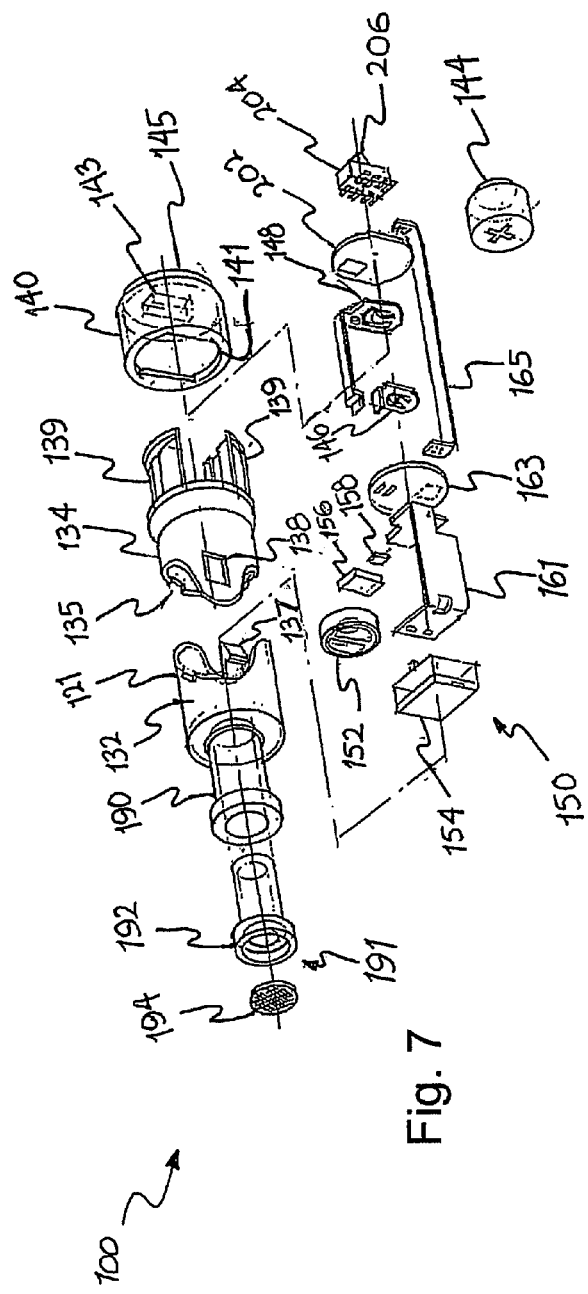
FIG. 7 illustrates an exemplary exploded view of the hearing aid of FIG. 6, in accordance with an embodiment of the present invention.

FIG. 7 illustrates an exemplary exploded view of the hearing aid 100 of FIG. 6, in accordance with an embodiment of the present invention. The hearing aid 100 may comprise an electro-acoustic subassembly or module 150, which may contain a microphone 152. Sounds may be received by the microphone 152, through sound inlet 135. Sound inlet 135 may be located on a side surface (e.g., surface 121) of the main body or housing 130, rather than on an end or faceplate type surface (e.g., surface 145). The hearing aid 100 may have one or more sound inlet 135 to ensure that sounds may be received by the microphone regardless of the orientation by which the hearing aid is inserted in the ear. The microphone 152 may then provide an electrical signal to amplifier 156 mounted on flexible circuits 161 and 163. In an embodiment of the present invention, the microphone 152 may be mounted near the ear-tip attachment so that it may pick up the naturally amplified sound of the ear and cochlea. In an embodiment of the present invention, the amplifier 156 may be a wide-dynamic-compression high-fidelity amplifier such as, for example, the K-AMP™ wide-dynamic-range compressor circuit described by U.S. Pat. No. 5,131,046, filed Nov. 3, 1989, incorporated into an integrated circuit that may include a new integrated circuit Class B amplifier. Accordingly, U.S. Pat. No. 5,131,046, filed Nov. 3, 1989, is hereby incorporated herein by reference in its entirety. A high-fidelity amplifier such as, for example, the K-AMP™ amplifier may provide no gain for high-level inputs, more gain for moderate-level inputs, and the greatest amount of gain for low-level inputs. The K-AMP™ amplifier may also include frequency-dependent compression, such that for low-level inputs, high frequency sounds may be amplified more than low-frequency sounds.

Figure 14:
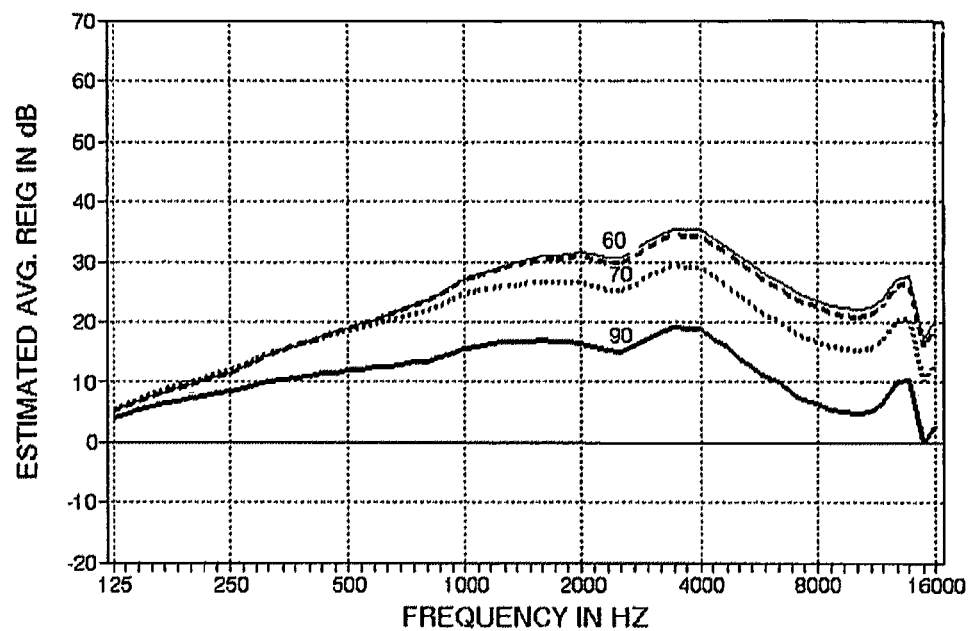
FIG. 14 illustrates a plot of the frequency response simulation of an exemplary high-fidelity amplifier, in accordance with an embodiment of the present invention.

Such an amplifier may eliminate the need for a separate amplifier, which may be otherwise required to maintain high sound quality and low distortion at high levels, and may provide acceptable battery drain. The electrical output of amplifier 156 may be connected to a receiver 154 through the circuit 161. The receiver 154 may provide amplified sound through the stem 190 and the ear-tip 180 to the ear of the user. Plots illustrating the performance of a high-fidelity amplifier such as, for example, the K-AMP™ amplifier are disclosed in U.S. Pat. No. 4,170,720, filed Mar. 3, 1978, which is hereby incorporated herein by reference in its entirety. FIG. 14 illustrates a plot of the frequency response simulation of an exemplary high-fidelity amplifier, in accordance with an embodiment of the present invention. The plot of FIG. 14 shows the frequency response for inputs at 60 dB, 70 dB, and 90 dB, illustrating that as the input sound gets quieter, the output gain increases.

Figure 15:
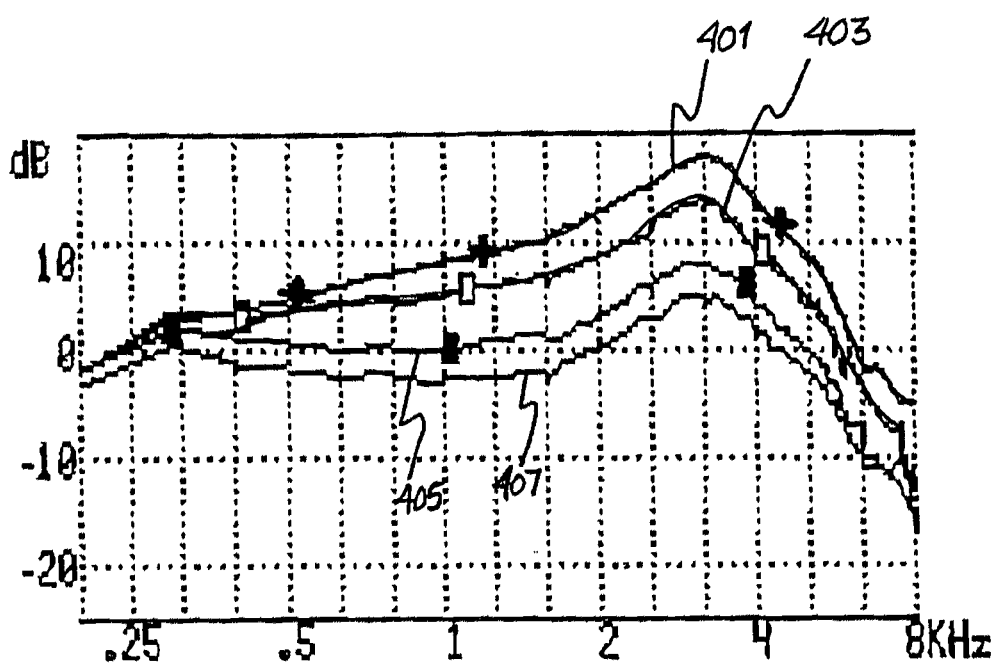
FIG. 15 illustrates a plot of an actual frequency response of an exemplary high-fidelity amplifier, in accordance with an embodiment of the present invention.

FIG. 15 illustrates a plot of an actual frequency response of an exemplary high-fidelity amplifier, in accordance with an embodiment of the present invention. The curves 401, 403, 405, and 407 correspond to inputs at 60 dB, 70 dB, 80 dB, and 90 dB, respectively. The curves of FIG. 15 illustrate the same result as the simulated curve of FIG. 14, that is, as the input sound gets quieter, the output gain increases.

Figure 16:
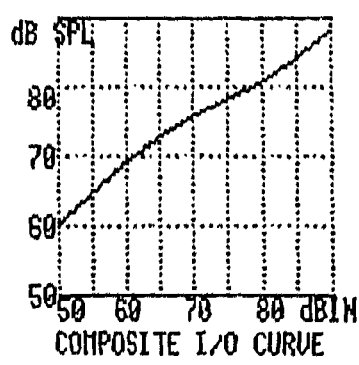
FIG. 16 illustrates a plot of an actual composite input/output curve of an exemplary high-fidelity amplifier, in accordance with an embodiment of the present invention.

FIG. 16 illustrates a plot of an actual composite input/output curve of an exemplary high-fidelity amplifier, in accordance with an embodiment of the present invention. FIG. 16 illustrates, as illustrated by FIG. 14 and FIG. 15, the output gain increases as the input sound gets quieter. For example, an input at 50 dB may correspond to an output at or around 60 dB, whereas, an input at 90 dB may correspond to an output at or around 90 dB.

In an embodiment of the present invention, the gain in the hearing aid 100 may take on one of three values corresponding to a selection made by the user of the hearing aid 100. One selection may be for essentially an off position, which may be equivalent to turning the hearing aid device 100 off. A second selection may be a standard gain position where a wide-dynamic-compression high-fidelity amplifier such as, for example the K-AMP™ wide-dynamic-range compressor circuit may be used. At the standard gain position, there may be no gain and no loss when there are loud sounds and noises in the environment surrounding the user; hence, inputting the loud sounds and noises as is into the user's ear. Additionally, at the standard gain position, amplification may be provided when the sounds in the environment surrounding the user are soft. A third selection may be a high gain position, which may be selected to accommodate users with greater hearing loss. At the high gain position, all sounds may be amplified, thus have positive gain, even when they are initially loud. In an alternative embodiment of the present invention, the hearing aid device 100 may provide more or less gain selections to accommodate several level of hearing loss severity.

In an embodiment of the present invention, the battery slot 142 may allow the battery to be inserted properly regardless of orientation. Battery contacts 146 and 148 may be connected to a flex-strip 165 and printed circuit disk 202 and to circuit 158, which may automatically switch the polarity of the battery connections as necessitated by the circuitry of the hearing aid 100. Circuit 158 may be an automatic polarity switching circuit such as, for example, the automatic polarity switching circuit of U.S. Pat. No. 5,623,550, filed Mar. 9, 1995. Accordingly, U.S. Pat. No. 5,623,550, filed Mar. 9, 1995 is hereby incorporated herein by reference in its entirety. As a result, a user of the hearing aid 100 need not be concerned with battery polarity, since the circuit 158 provides proper polarity to circuit 156 in either case.

In an embodiment of the present invention, the circuit 158 may not be utilized, and hence may not provide an automatic polarity switching circuitry. In such an embodiment, the battery slot 142 may have an irregular shape corresponding to the external shape of the battery such that the battery may fit into the battery slot 142 only when the battery is inserted with the correct orientation. As a result, the shape of the battery slot 142 may ensure correct polarity of the battery.

In an embodiment of the present invention, the battery sleeve 140 may have an end or faceplate surface 145 having an opening 143 located at or on an end outer surface of the hearing aid 100. Opening 143 may allow a lever 206 of the switch 204 to be activated when the battery sleeve 140 is in the normal closed position as shown in FIG. 4.

In an embodiment of the present invention, the replaceable acoustic damper assembly 191 may include the acoustic damper 194, and an acoustic damper housing 192, which may be molded to be a snug press fit into the stem 190 of the hearing aid 100. The acoustic damper 194 may provide a smoother frequency response in the hearing aid 100 and may also prevent wax from reaching the receiver 154.

In an embodiment of the present invention, for ease of assembly, rectangular hole 138 and pawl 137 may be molded in halves 134 and 132, respectively, of the main body 130. Thus, during assembly, the housing halves 134 and 132 may snap together and enclose electro-acoustic subassembly or module 150. The battery sleeve 140 may have a lip 141, which may be molded to snap over sides 139 of portion 134 of the main body 130 of the hearing aid 100. The sides 139 form the battery slot 142, which may be designed to accept a battery equally well from either side. Thus the battery 144 may be inserted in any one of the four possible ways and the hearing aid 100 will still function properly.

Figure 8:
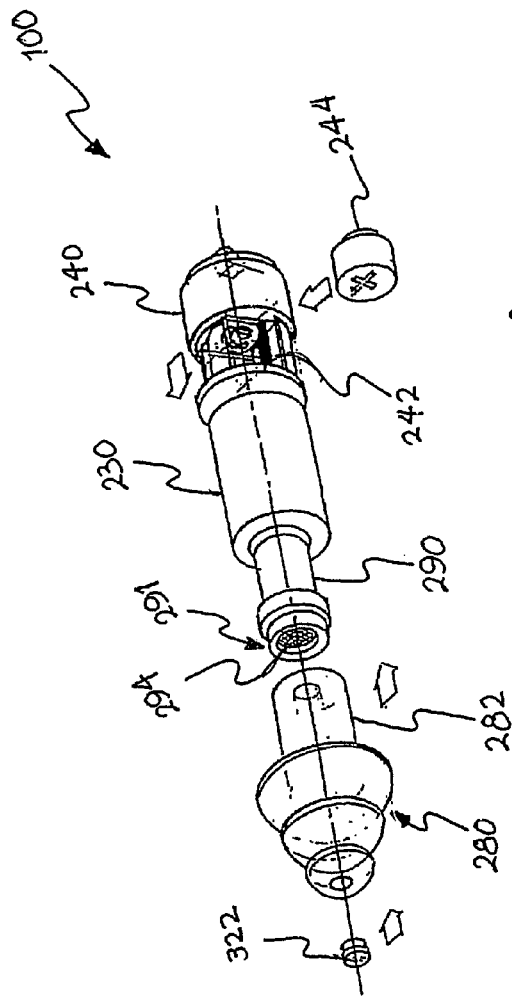
FIG. 8 illustrates another exemplary view of the hearing aid of FIG. 4 with the ear-tip removed, in accordance with an embodiment of the present invention.

FIG. 8 illustrates another exemplary view of the hearing aid 100 of FIG. 4 with the ear-tip removed, in accordance with an embodiment of the present invention. In an embodiment of the present invention, the hearing aid 100 may comprise a stem 290 containing replaceable acoustic damper assembly 291. The replaceable acoustic damper assembly 291 may contain an acoustic damper 294. In an embodiment of the present invention, the hearing aid 100 may also comprise a wax guard 322, which may be added to an ear-tip 280.

Figure 9:
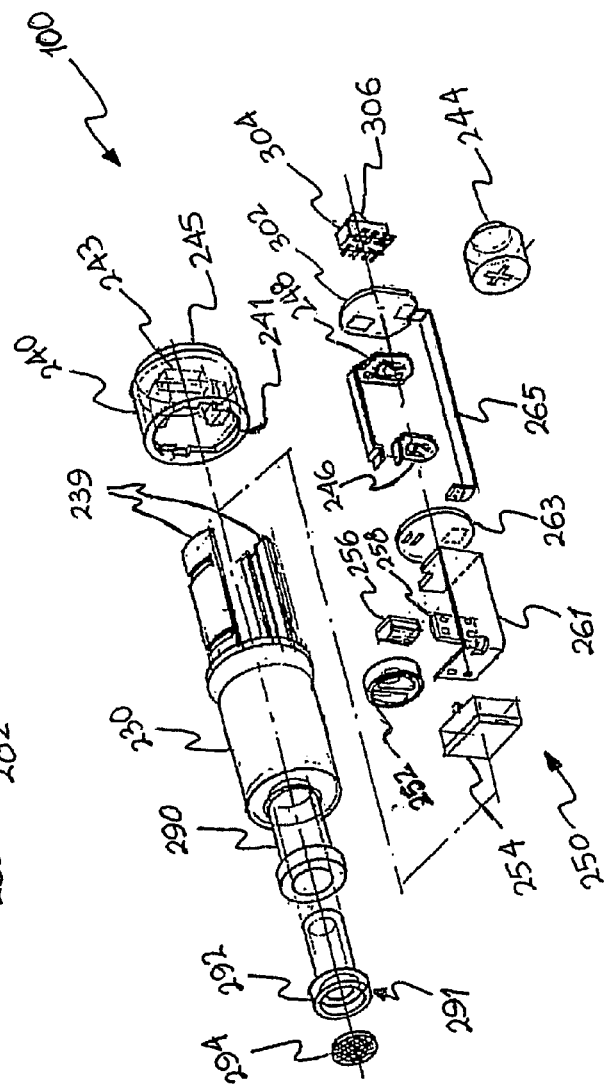
FIG. 9 illustrates an exemplary exploded view of the hearing aid of FIG. 8, in accordance with an embodiment of the present invention.

FIG. 9 illustrates an exemplary exploded view of the hearing aid 100 of FIG. 8, in accordance with an embodiment of the present invention. The hearing aid 100 may comprise an electro-acoustic subassembly or module 250, which may contain a microphone 252. Sounds may be received by the microphone 252, through one or more sound inlet in the hearing aid main body or housing 230. The microphone 252 may then provide an electrical signal to amplifier 256 mounted on flexible circuits 261 and 263. In an embodiment of the present invention, the microphone 252 may be mounted near the ear-tip attachment so that it may pick up the naturally amplified sound of the ear and cochlea, which may not be possible were the microphone placed on an end or faceplate type surface such as, for example, surface 245. In an embodiment of the present invention, the amplifier 256 may be a wide-dynamic-compression high-fidelity amplifier. The electrical output of amplifier 256 may be connected to a receiver 254 through the circuit 261. The receiver 254 may provide amplified sound through the stem 290 and the ear-tip 280 to the ear of the user.

In an embodiment of the present invention, the battery slot 242 allows the battery to be inserted properly regardless of orientation. Battery contacts 246 and 248 may be connected to a flex-strip 265 and printed circuit disk 302 and to circuit 258, which may automatically switch the polarity of the battery connections as necessitated by the circuitry of the hearing aid 100. As a result, a user of the hearing aid 100 need not be concerned with battery polarity, since the circuit 258 provides proper polarity to circuit 256 in either case.

In an embodiment of the present invention, the battery sleeve 240 may have an end or faceplate surface 245 having an opening 243 located at or on an end outer surface of the hearing aid 100. Opening 243 may allow a lever 306 of the switch 304 to be activated when the battery sleeve 240 is in the normal closed position as shown in FIG. 4.

In an embodiment of the present invention, the replaceable acoustic damper assembly 291 may include the acoustic damper 294, and an acoustic damper housing 292, which may be molded to be a snug press fit into the stem 290 of the hearing aid 100. The acoustic damper 294 may provide a smoother frequency response in the hearing aid 100 and may also prevent wax from reaching the receiver 254.

In an embodiment of the present invention, for ease of assembly, the battery sleeve 240 may have a lip 241, which may be molded to snap over sides 239 of the main body or housing 230 of the hearing aid 100. The sides 239 form the battery slot 242, which may be designed to accept a battery equally well from either side. Thus the battery 244 may be inserted in any of four possible ways and the hearing aid 100 will function properly. In addition, during assembly, electro-acoustic subassembly or module 250 simply slides into an open end of hearing aid main body or housing 230. In this embodiment and that of FIG. 7, due to the symmetric design of the hearing aid main body or housing 230/130, the electro-acoustic subassembly of module 250/150 need not be inserted in a particular orientation. The functionality of the electro-acoustic subassembly 250/150 may be independent of its orientation due to, for example, the symmetry of the housing 230/130 and the symmetry of the subassembly 250/150, and more specifically the microphone 252/152.

Figure 10:
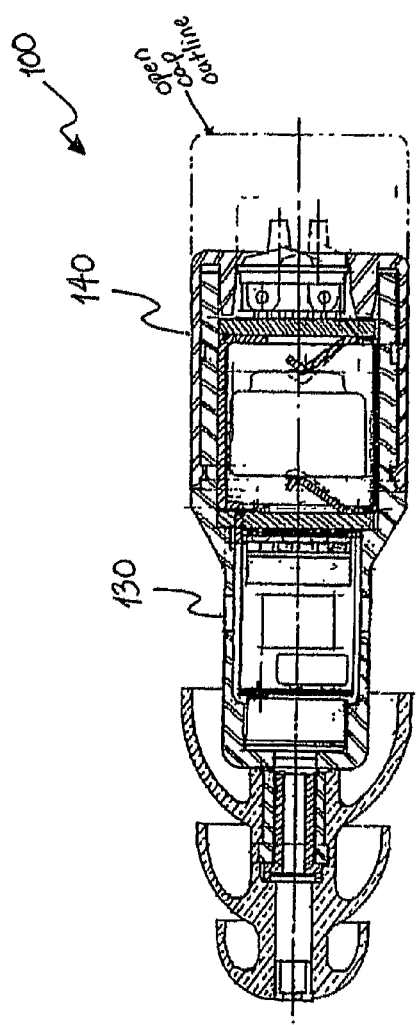
FIG. 10 illustrates an exemplary side view of the hearing aid of FIG. 4 with the battery sleeve closed, in accordance with an embodiment of the present invention.
Figure 11:
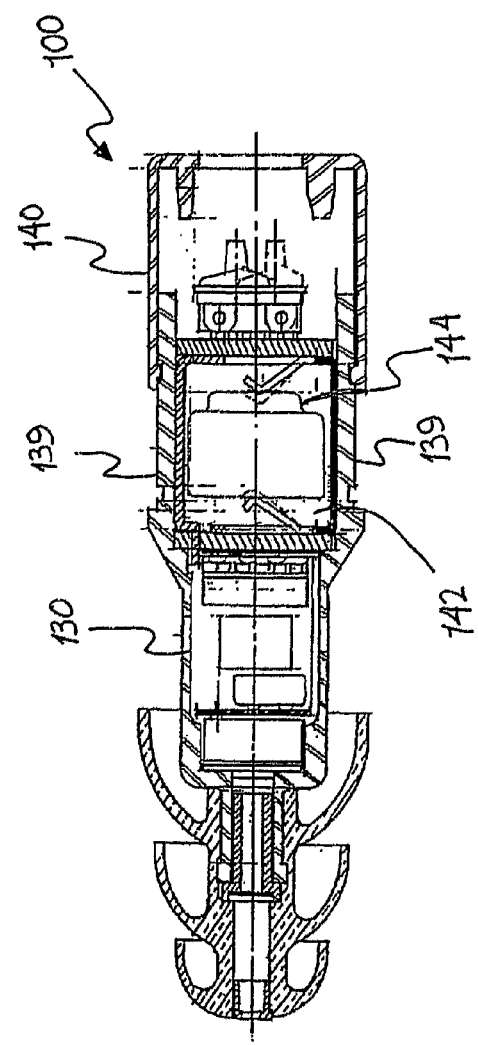
FIG. 11 illustrates an exemplary side view of the hearing aid of FIG. 4 with the battery sleeve retracted, in accordance with an embodiment of the present invention.

FIG. 10 and FIG. 11 illustrate exemplary side views of the hearing aid 100 of FIG. 4 with the battery sleeve 140 closed and retracted, respectively, in accordance with an embodiment of the present invention. The battery sleeve 140 may be closed as in FIG. 10, and in such an embodiment the hearing aid 100 may be worn by the user. When, for example, the user may want to replace the battery 144, the battery sleeve 140 may be retracted, and the battery slot 142 may be exposed (as illustrated by FIG. 11) and the battery 144 may be removed and replaced. The battery slot 142 may be defined by the sides 139, which may be attached to the hearing aid main body or housing 130. In embodiments of the present invention, an old battery 144 need not be removed, instead a new battery may replace the old battery by simply inserting the new battery into the battery slot in any of the four possible positions, and doing so forces the old battery to be disposed of automatically from the other side.

Figure 12:
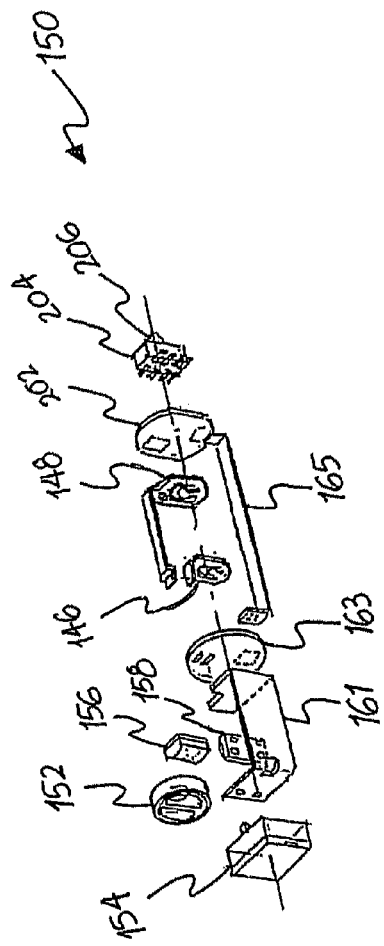
FIG. 12 illustrates an exemplary exploded view of the circuit assembly of the hearing aid of FIG. 4, in accordance with an embodiment of the present invention.
Figure 13:
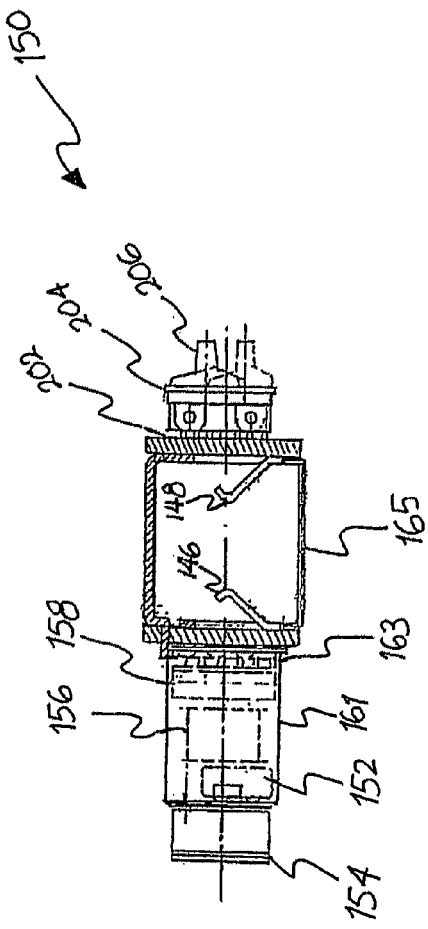
FIG. 13 illustrates an exemplary side view of the circuit assembly of the hearing aid of FIG. 4, in accordance with an embodiment of the present invention.

FIG. 12 and FIG. 13 illustrate an exemplary exploded and side view, respectively, of the circuit subassembly or module 150 of the hearing aid 100 of FIG. 4, in accordance with an embodiment of the present invention. In an embodiment of the present invention, the microphone 152 and the receiver 154 may be mounted on opposite sides of the circuit 161. In such an embodiment the microphone 152 and the receiver 154 may be connected through the circuit 161. In another embodiment of the present invention, the microphone 152 and the receiver 154 may be mounted on the same side of the circuit 161. In such an embodiment the microphone 152 and the receiver 154 may be connected directly or through the circuit 161.

The subassembly or module 150 with a battery inserted between battery contacts 146 and 148, comprises a complete hearing aid and may provide a hearing aid functionality by itself, regardless of housing. In embodiments of the present invention, the subassembly or module 150 may be inserted, with a battery, into a housing to provide hearing aid functionality without requiring any additional wiring or other set up.

In embodiments of the present invention, the hearing aid 100 may provide a smooth, high-fidelity frequency response. The hearing aid 100 may also provide a wide-dynamic-range compression amplification, in addition to a good seal to the ear that is adequately comfortable for occasional use. The battery insertion into the hearing aid 100 may not require too much dexterity since either orientation and either insertion direction of a battery into the battery slot will be acceptable. Thus, hearing aid 100 may require very little, if any, training to get proper functionality.

In embodiments of the present invention, the hearing aid 100 may provide a high-quality hearing aid for a user by having the frequency response and gain automatically adapted as a function of the level of the incoming signals. As a result, the hearing aid 100 may be adequate for occasional use for the majority of persons with mild-to-moderate hearing loss.

The hearing aid 100 may also be cylindrical in shape such that insertion into the ear only requires that the orientation of the hearing aid 100 be such that the soft ear-tip 180 is inserted toward the ear. No other specific orientation by the user is required before insertion into the ear, because of, for example, the symmetrical shape of the housing of the hearing aid. This aspect of the present invention may be of particular benefit to users who may have difficulty with hand dexterity or poor vision, for example.

In embodiments of the present invention, the battery of the hearing aid 100 may be replaced by inserting a new battery into either opening of a battery slot, in either orientation, wherein the spent battery is automatically and simultaneously ejected from the opposite opening and discarded.

In an embodiment of the present invention, the wide-dynamic-compression high-fidelity amplifier 156 may be incorporated into an integrated circuit that includes a new integrated circuit amplifier, which eliminates the need for a separate amplifier that would otherwise be required in order to maintain high sound quality and low distortion at high levels with acceptable battery drain.

In an embodiment of the present invention, the circuitry of the hearing aid 100 may operate without high power consumption, thus elongating the lifecycle of a battery.

In an embodiment of the present invention, the ear-tip of the hearing-aid device may be made with flexible material such that when inserted in the ear canal of a user of the hearing aid, the ear-tip may conform to the shape of the user's ear canal to provide the highest seal and minimize feedback of noises and hence minimize distortion.

In an embodiment of the present invention, the hearing-aid device may be small in size, such that it may fit in the user's ear without being uncomfortable or visible, but such that the user may still easily access the device and remove it. In one embodiment of the present invention, the hearing aid, while completely assembled and the battery slot covered, may be approximately 1.25 inches in length, and with the battery sleeve open and the battery slot completely exposed the hearing aid may be approximately 1.5 inches in length. The cylindrical portion of the body of the hearing-aid device may be approximately less than 0.5 inches in diameter, and the largest flange of the ear-tip may be approximately 0.5 inches in diameter. It should be understood that these dimensions are representative of one embodiment of the present invention, and the hearing-aid device of the present invention may have dimensions slightly variable from the ones disclosed hereinabove.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An in the ear hearing aid device comprising:
a hearing aid housing comprising:
an ear canal insertion end,
an opposite end, wherein the opposite end is opposite the ear canal insertion end, and
a cylindrical side between the ear canal insertion end and the opposite end, wherein the cylindrical side comprises a battery slot and at least one sound inlet; and
a circuit module housed in the hearing aid housing comprising a battery, a microphone, and a receiver, wherein the microphone receives sounds through the at least one sound inlet.

2. The in the ear hearing aid device of claim 1, wherein the circuit module alone provides hearing aid functionality without additional wiring and set up with the hearing aid housing.

3. The in the ear hearing aid device of claim 1, wherein the hearing aid housing is symmetrical.

4. The in the ear hearing aid device of claim 1, wherein the circuit module further comprises an amplifier.

5. The in the ear hearing aid device of claim 1, wherein the circuit module further comprises a switch.

6. The in the ear hearing aid device of claim 5, wherein the switch is an on-off switch.

7. The in the ear hearing aid device of claim 5, wherein the switch is a gain-control switch.

8. The in the ear hearing aid device of claim 1, wherein the hearing aid device does not require specific orientation of insertion in a user's ear canal to function effectively.

9. The in the ear hearing aid device of claim 1, wherein the battery slot is open laterally on opposing sides of the cylindrical side.

10. The in the ear hearing aid device of claim 9, wherein the battery is insertable on both opposing sides of the battery slot.

11. The in the ear hearing aid device of claim 1, wherein the battery can be inserted into the battery slot with either polarity.

12. The in the ear hearing aid device of claim 1, wherein the battery can be inserted in the battery slot to replace an old battery, while the old battery is still in the battery slot, and inserting a battery in the battery slot causes the old battery to be displaced without having to first separately displace the old battery.

13. The in the ear hearing aid device of claim 1, wherein inserting the battery in the battery slot makes the hearing aid operable, without requiring any further assembly.

14. The in the ear hearing aid device of claim 1, wherein the circuit module further comprises a circuit board, wherein the microphone and the receiver are on opposite sides of the circuit board.

15. The in the ear hearing aid device of claim 1, wherein the detachably coupled ear-tip comprises three flanges decreasing in size toward a flange closest to an ear canal.

* * * * *